US008527895B2

(12) United States Patent
Mossakowski

(10) Patent No.: US 8,527,895 B2
(45) Date of Patent: Sep. 3, 2013

(54) VIRTUAL KEYBOARD OF A MOBILE TERMINAL

(75) Inventor: Gerd Mossakowski, Ahlen (DE)

(73) Assignee: T-Mobile International, AG, Bonn (DE)

( * ) Notice: Subject to any disclaimer, the term of this patent is extended or adjusted under 35 U.S.C. 154(b) by 208 days.

(21) Appl. No.: 12/745,080

(22) PCT Filed: Nov. 27, 2008

(86) PCT No.: PCT/EP2008/010063
§ 371 (c)(1),
(2), (4) Date: Aug. 4, 2010

(87) PCT Pub. No.: WO2009/071234
PCT Pub. Date: Jun. 11, 2009

(65) Prior Publication Data
US 2010/0313160 A1    Dec. 9, 2010

(30) Foreign Application Priority Data

Dec. 8, 2007 (DE) .......................... 10 2007 059 273

(51) Int. Cl.
*G06F 13/00* (2006.01)
*G06F 15/00* (2006.01)
(52) U.S. Cl.
USPC .......................................... 715/773; 713/708
(58) Field of Classification Search
USPC ................. 715/773, 708, 721–723, 716, 752, 715/762; 345/153, 156
See application file for complete search history.

(56) References Cited

U.S. PATENT DOCUMENTS

| 2004/0080487 | A1* | 4/2004 | Griffin et al. ................. 345/156 |
| 2004/0095996 | A1* | 5/2004 | Mossakowski ........... 375/240.01 |
| 2006/0146009 | A1* | 7/2006 | Syrbe et al. .................... 345/156 |
| 2007/0162851 | A1* | 7/2007 | Liu et al. ........................ 715/708 |
| 2009/0300535 | A1* | 12/2009 | Skourup et al. ............... 715/773 |
| 2010/0313160 | A1* | 12/2010 | Mossakowski ............... 715/773 |

FOREIGN PATENT DOCUMENTS

| DE | 103 13 019 | 10/2004 |
| DE | 10 2005 024 638 | 12/2006 |
| EP | 1 507 196 | 2/2005 |
| WO | 02/078352 | 10/2002 |
| WO | 2004/006615 | 8/2004 |
| WO | 2005/043332 | 5/2005 |
| WO | 2006/036069 | 4/2006 |
| WO | WO 2006036069 A1 * | 4/2006 |

OTHER PUBLICATIONS

Examination Report in corresponding German Application No. 10 2007 059 273.8 dated Apr. 13, 2010.

(Continued)

*Primary Examiner* — Cao "Kevin" Nguyen
(74) *Attorney, Agent, or Firm* — Faegre Baker Daniels LLP

(57) ABSTRACT

A method for representing a virtual keyboard on the display of a mobile terminal, as for example a cell phone, wherein the mobile terminal comprises a camera for capturing image data, a display for representing the image data and a keyboard for selecting menu functions or for inputting, for example, a text message. The keyboard is designed as a virtual keyboard on the display of the mobile terminal and a cursor represented on the virtual keyboard is designed to be moveable, wherein the cursor moves according to the movements of the mobile terminal in the spatial axes to the corresponding keyboard field of the virtual keyboard.

16 Claims, 1 Drawing Sheet

(56) References Cited

OTHER PUBLICATIONS

Search Report in corresponding German Application No. 10 2007 059 273.8 dated Sep. 19, 2008.

(*) = Foreign patent document with English language abstract.
(*) = Foreign patent document together with English language abstract.

* cited by examiner

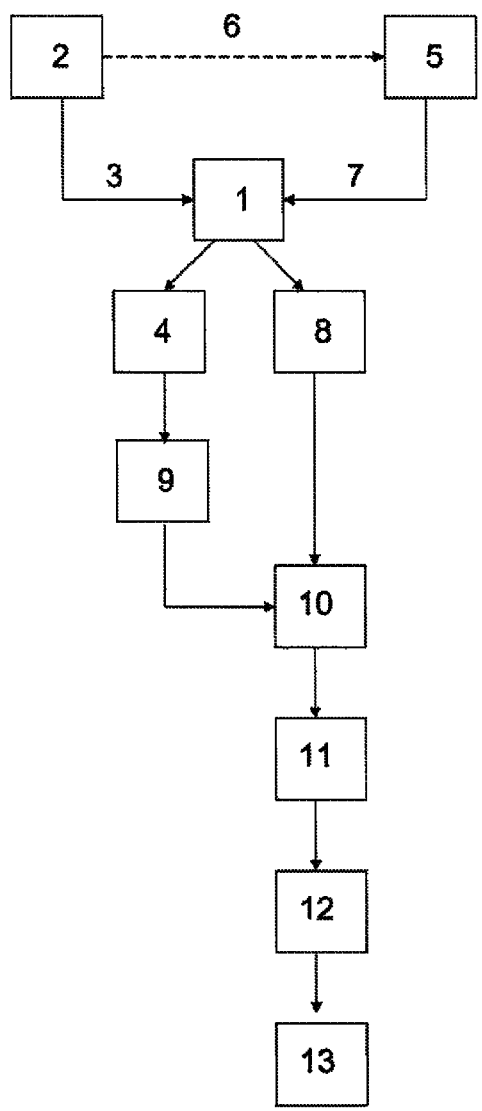

VIRTUAL KEYBOARD OF A MOBILE TERMINAL

BACKGROUND AND SUMMARY

The invention relates to a method for representing a moveable keyboard or a moveable cursor on the display of a mobile terminal.

Mobile terminals such as for example a "cell phone" nowadays exhibit more and more functions such as for example camera and video functions, wherein on the part of the operator the dimensions of the "cell phone" are supposed to be as small as possible. For this reason the mobile terminals are becoming smaller and smaller in dimensions.

However, in this connection the problem of operability arises, in particular in the case of text input for example for an SMS (short message service) on the keyboards, becoming smaller and smaller.

Currently there are a number of different input options for texts, which are classified as follows:

Input of text via a full-value mini-keyboard, such as for example an MDA (Mobile Digital Assistant), wherein this input function exhibits the disadvantage of keys that are too small and leads to incorrect entry of a text.

Input of texts via a numeric keypad by multiple allocation of the number keys, such as for example in the case of a cell phone, wherein this input function exhibits the disadvantage of an incorrect entry and a relatively high expenditure of time.

Operation by means of a touch screen, in which case a keyboard is represented on the display. For example a small stylus is used for operation, wherein this input function exhibits the disadvantage that the representation of a keyboard field exhibits relatively high memory requirements.

Operation of a touch screen which exhibits OCR recognition, wherein this input function likewise exhibits relatively great memory requirements for the representation of a keyboard field.

A menu navigation of current mobile terminals for the input of texts is based in part on text or icons which are selected for example with the help of a scroll wheel or a multifunction button. In the process the multifunction button as a rule offers the selection possibility of moving the menu cursor to the left, the right, up or down and to confirm the selection by pressing the multifunction button. Intermediate regions are not provided due to the mechanism that is used.

In addition different applications are also known in the field of augment reality.

As an example of this the superposition of a photographic image with for example a cross-hair for central orientation of an image is to be pointed out.

Also known are games which build on this technology, in which case the gamer is photographed with a camera and his movements are integrated into a virtual world, such as for example in the case of a golf simulator.

The basic disadvantage of this aforementioned application is the large memory requirements for the storage of the image data.

WO 2006/036069 describes a method for the representation of a virtual keyboard on the display of a mobile terminal, such as for example a mobile telephone, wherein the mobile terminal exhibits a camera for the capture of image data, a display for the representation of the image data and a keyboard for the selection of menu functions or for the input of for example a text message. The keyboard is represented as a virtual keyboard on the display of the mobile terminal and a cursor moveable over the virtual keyboard is formed, wherein the cursor moves correspondingly analogous to movements of the mobile terminal executed on the corresponding keyboard field of the virtual keyboard.

A similar method is disclosed in DE 10 2005 024 638 A1.

The object of the present invention can hence be seen in improving a mobile terminal such that the input of texts takes place via a keyboard field whose size is configured independently from the dimensions of the mobile terminal.

For solution of the task the invention is characterized by the features of the independent patent claim 1.

The method represents the keyboard as a virtual keyboard on the display of the mobile terminal and configures a cursor moveable via the virtual keyboard wherein the cursor moves correspondingly analog to the movements of the mobile terminal executed in the spatial axes on the corresponding keyboard field of the virtual keyboard.

In the reverse implication of this inventive embodiment the virtual keyboard is represented on the display of the mobile terminal as a moveable keyboard which moves correspondingly executed movements of the mobile terminal in the spatial axes correspondingly on the display, wherein the cursor is not moveable and preferably arranged centrally on the display.

This exhibits the advantage that the input of a text message or a menu selection can also be realized in the case of mobile terminals with relatively small case dimensions, since the input of a text message or a menu selection via a mechanical keyboard field leads to time-consuming incorrect entries.

For the realization of a moveable cursor or of a moveable keyboard on the display of a mobile terminal a method known from the state of the art for compression and decompression of image data is employed.

A method known from the state of the art for the compression and decompression of image data is disclosed with the publication DE 101 13 880 A1, wherein for the representation of images such as for example of a keyboard, the method of prioritizing pixel groups is employed, wherein the image data captured with a camera exhibit a matrix of individual pixels, which exhibit a pixel value variable in time which describes the color or brightness information of the pixel. In the process each pixel is assigned a priority and correspondingly is saved sorted in the matrix. The pixels and the pixel values are transferred or saved, wherein a pixel exhibits a high priority when the distance to the adjacent pixel is great. In the case of a reconstruction only the current pixel values are represented, wherein pixels that have not yet been transferred are calculated from already transferred pixels.

For the realization of a keyboard represented virtually on a display of a mobile terminal a camera is used for capture of the required image data, as it is arranged in most mobile terminals such as for example in a "cell phone".

For the confirmation of a selected keyboard field preferably an operating button is provided which for example confirms the selection by means of pressing.

In addition a cursor is displayed on the display, said cursor being moveable by means of movements of the mobile terminal (cell phone) in the spatial axes in analogous direction in the display of the mobile terminal.

For the detection of the movement the photographed images of the camera corresponding to the method known from the state of the art are evaluated for the compression and decompression of image data.

In order to save computing power only relevant image areas are taken into consideration for evaluation. In correspondence to the movement, left, right, up, down, front and rear as well as the speed can be detected.

In comparison to the operation of a mechanical multifunction button, here a significantly finer resolution is possible than on/off.

If now a keyboard is represented on the display and one places the cursor on the desired keyboard field by means of moving of the mobile terminal (cell phone), one can confirm the selection by means of simple pressing of the multifunction button.

This exhibits the advantage in comparison to the aforementioned methods that here a one-hand operation suffices for the selection and confirmation of a keyboard field, and also no additional resources, such as for example a stylus, are necessary as is the case with a touch screen.

In addition in comparison with the aforementioned methods the advantage exists that with the exception of an operating button for the actual selection, no further operating elements are necessary.

Hence a keyboard can be dispensed with in a mobile terminal, such as for example in a cell phone, wherein the casing of the device can be configured smaller or the display can be configured larger.

On the basis of the purely optical capture in addition a finer control is possible, which in addition also exhibits virtually no wear and tear.

In the following the invention will be described more closely with the help of a drawing representing only one embodiment. In this connection further inventive features and advantages of the invention arise from the drawing and its description.

BRIEF DESCRIPTION OF THE DRAWING

FIG. 1: shows a schematic flow chart of a preferred embodiment of the inventive method

DETAILED DESCRIPTION

The method shown in FIG. 1 for the representation of a virtual keyboard in a mobile terminal 1 is geared toward the recognition of the position change of the mobile terminal 1 in the direction of one of the three spatial axes, as a result of which a virtual movement of a cursor represented via the virtual keyboard is produced.

In a first step of the method the mobile terminal 1 captures image data 3 by means of its integrated camera in the first camera position 2.

These image data 3 of the camera position 2 are saved in a second step of the method corresponding to formed, prioritized pixel groups 4 in accordance with the state of the art.

In this connection in accordance with the method known from the state of the art the highest prioritized pixel groups automatically describe the relevant areas of an image.

In a third step of the method the position values 9 of the prioritized pixel groups 4 of the first camera position 2 are saved in the mobile terminal 1.

If one moves the camera 2 in one of the three directions of the spatial axes to a second camera position 5, the position values 9 of the formed prioritized pixel groups 4 change in corresponding manner.

In a fourth step of the method the image data 7 are captured in the case of the second camera position 5, wherein in a fifth step of the method the prioritized pixel groups 8 are formed with the associated position values in the case of the camera position 5.

In the sixth step of the method the position values 10 of the formed prioritized pixel groups 8 in the case of the camera position 5 are compared to the position values 9 of the formed prioritized pixel groups 4 of the camera position 2.

These aforementioned steps of the method shall be explained using a simple example.

The highest prioritized pixel groups A1, B1 and C1 in the case of the camera position 2 are determined at the positions a1, b1 and c1 of a matrix. In the process A1, B1 and C1 are prioritized such that the pixel values of A1, B1 and C1 in addition vary widely.

In the case of a second captured image in the case of the camera position 5 the highest prioritized pixel groups A2, B2 and C2 are determined at the positions a2, b2 and c2 of a matrix.

The displacement of the positions of a1, b1 and c1 of the camera position 2 to the positions a2, b2 and c2 of the camera position 5 is directly related to the movement of the mobile terminal 1.

From the comparison of the values a1 to a2, b1 to b2 and c1 to c2, the respective displacement vectors 11 are determined. If all three determined displacement vectors 11 point in the same direction, the mobile terminal 1 has moved in the corresponding direction.

In correspondence to the determined displacement vectors 11 a cursor on the display of the mobile terminal 1 is moved 12.

If a keyboard is in addition displayed on the display, by means of pressing the operating button a keyboard field with an associated letter, at which the cursor is currently located, is confirmed for selection. After the letter is selected the keyboard appears again in the neutral position.

This aforementioned example illustrates the fundamental approach of the inventive method.

Of course the method described here can in correspondence to application requirements be used also for the control of other terminal functionalities, such as for example general functions for menu control. In addition the basic method can also be expanded by a plurality of functions. In place of the 3 pixel groups more pixel groups can also be used.

If the three best pixel groups 4 are detected in the first image in the case of the camera position 2, the subsequently captured images, such as for example in the case of the camera position 5 are no longer complete, but rather are only evaluated in the vicinity of the found pixel groups 8. In this way time-consuming computing time and hence battery run times are economized.

In the case of darkness an additional camera light is employed in order to detect the movements of the mobile terminal 1.

By moving of the mobile terminal 1 onto an object or away from an object additional menu functions can be opened or closed, such as for example the selection option of special characters (@ or µ or the like).

Both linear and non-linear movements can be carried out for the rapid moving of a cursor over larger display areas.

Thus for example a parallel displacement of the mobile terminal 1 to a surface leads to a linear displacement of the cursor on the display.

Non-linear displacements of the cursor are for example produced by means of an additional rotary movement of the mobile terminal 1.

For simplification of the control for example software scanning is used in order to securely select the letter/menu item of the respective keyboard field.

For an additional application the cursor can also be firmly positioned on the display, wherein the selection fields such as for example the keyboard fields of a virtual keyboard shift displace corresponding to the movement of the mobile terminal 1.

The inventive subject matter of the present invention does not only arise from the subject matter of the individual patent claims, but rather also from the combination of the individual patent claims with one another.

All information and features disclosed in the documentation, including the abstract, in particular those in the configuration of the method represented in the drawings are claimed as essential to the invention, to the extent which they are novel in comparison to the state of the art either individually or in combination.

LIST OF REFERENCE SYMBOLS 1. mobile terminal (e.g. cell phone)
2. first camera position
3. image data of the first camera position
4. images of prioritized pixel groups of the first camera position
5. second camera position
6. position change of the camera
7. image data of the second camera position
8. images of prioritized pixel groups of the second camera position with the associated position values
9. storage of the position values of the prioritized pixel groups of the first camera position
10. comparison of the saved position values of the first camera position with the position values of the second camera position
11. forming of displacement vectors
12. movement of the cursor or of the virtual keyboard on the display of the mobile terminal
13. confirmation of the selected keyboard field by means of the operating button

The invention claimed is:

1. A method for representing a virtual keyboard on the display of a mobile terminal, such as for example a cell phone, wherein the mobile terminal includes a camera for capturing image data, a display for representing the image data and a keyboard for selecting menu functions or for inputting, for example, a text message, wherein the keyboard is designed as a virtual keyboard on the display of the mobile terminal and a cursor represented on the virtual keyboard is designed to be moveable, wherein the cursor moves according to the movements of the mobile terminal in the spatial axes to the corresponding keyboard field of the virtual keyboard, the method comprising steps wherein image data of a first camera position of the camera are captured, said image data being saved in prioritized pixel groups to be formed, wherein the image data captured with a camera include a matrix of individual picture points in the form of pixels, said pixels having a pixel value that is variable in time, said pixel value describing color or brightness information of the pixel, wherein each pixel is assigned a priority and is saved and sorted in the matrix according to this priority, wherein the pixels and the pixel values are saved, wherein a pixel has the highest priority when the color or brightness difference to the adjacent pixel is great, and wherein the highest prioritized pixel groups automatically correspond to the relevant areas of an image, in addition to the formed pixel groups the corresponding position values of the pixel groups of the first camera position are saved, and further in the case of a movement of the camera from the first camera position to a second camera position the image data in the case of the second camera position are captured and prioritized pixel groups with the associated position values are formed, and the position values of the prioritized pixel groups of the first camera position are compared to the position values of the prioritized pixel groups of the second camera position, and from the comparison of the position values of the first and second camera position displacement vectors are determined, said displacement vectors moving the cursor on the display of the mobile terminal when the displacement vectors are pointed in a direction, and further wherein the three highest priority pixel groups are captured in the image of the first camera position, and the subsequently captured image data of the second camera position are no longer complete but only evaluated in the vicinity of the highest priority pixel groups found in the image data of the second camera position.

2. The method according to claim 1, wherein the virtual keyboard represented on the display of the mobile terminal is represented as a moveable keyboard which moves according, to the movements of the mobile terminal on the display, and wherein the cursor is not arranged moveable and preferably centrally on the display.

3. The method according to claim 2, wherein the movement of the cursor on the keyboard represented on the display of the mobile terminal constitutes the selection of a keyboard field, and wherein the selection of the keyboard field is confirmed by means of an arranged operating button.

4. The method according to claim 3, wherein after selection and confirmation of a keyboard field the represented virtual keyboard moves to a neutral position.

5. The method according to claim 4, wherein the method configures a menu control wherein the selection of a menu item can be carried out by means of a position change of the mobile terminal.

6. The method according to claim 3, wherein the method configures a menu control wherein the selection of a menu item can be carried out by means of a position change of the mobile terminal.

7. The method according to claim 2, wherein after selection and confirmation of a keyboard field the represented virtual keyboard moves to a neutral position.

8. The method according to claim 7, wherein the method configures a menu control wherein the selection of a menu item can be carried out by means of a position change of the mobile terminal.

9. The method according to claim 2, wherein the method configures a menu control wherein the selection of a menu item can be carried out by means of a position change of the mobile terminal.

10. The method according claim 1, wherein the movement of the cursor on the keyboard represented on the display of the mobile terminal constitutes the selection of a keyboard field, and wherein the selection of the keyboard field is confirmed by means of an arranged operating button.

11. The method according to claim 10, wherein after selection and confirmation of a keyboard field the represented virtual keyboard moves to a neutral position.

12. The method according to claim 11, wherein the method configures a menu control wherein the selection of a menu item can be carried out by means of a position change of the mobile terminal.

13. The method according to claim 10, wherein the method configures a menu control wherein the selection of a menu item can be carried out by means of a position change of the mobile terminal.

14. The method according to claim 1, wherein after selection and confirmation of a keyboard field the represented virtual keyboard moves to a neutral position.

15. The method according to claim 14, wherein the method configures a menu control wherein the selection of a menu item can be carried out by means of a position change of the mobile terminal.

16. The method according to claim 1, wherein the method configures a menu control wherein the selection of a menu item can be carried out by means of a position change of the mobile terminal (1).

* * * * *

UNITED STATES PATENT AND TRADEMARK OFFICE
CERTIFICATE OF CORRECTION

PATENT NO. : 8,527,895 B2
APPLICATION NO. : 12/745080
DATED : September 3, 2013
INVENTOR(S) : Gerd Mossakowski It is certified that error appears in the above-identified patent and that said Letters Patent is hereby corrected as shown below:

In the Claims:

Claim 2, Column 6, Line 17, after "according" delete ","

Signed and Sealed this
Twelfth Day of November, 2013

Teresa Stanek Rea
*Deputy Director of the United States Patent and Trademark Office*